United States Patent
Dirik et al.

(10) Patent No.: US 11,188,234 B2
(45) Date of Patent: Nov. 30, 2021

(54) CACHE LINE DATA

(71) Applicant: Micron Technology, Inc., Boise, ID (US)

(72) Inventors: Cagdas Dirik, Indianola, WA (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 147 days.

(21) Appl. No.: 15/690,503

(22) Filed: Aug. 30, 2017

(65) Prior Publication Data

US 2019/0065072 A1 Feb. 28, 2019

(51) Int. Cl.
*G06F 3/06* (2006.01)
*G06F 12/0868* (2016.01)
*G06F 12/0806* (2016.01)
*G06F 12/128* (2016.01)
*G06F 12/0879* (2016.01)
*G06F 12/0882* (2016.01)
*G06F 12/0862* (2016.01)

(52) U.S. Cl.
CPC .......... *G06F 3/0611* (2013.01); *G06F 3/0659* (2013.01); *G06F 3/0685* (2013.01); *G06F 12/0806* (2013.01); *G06F 12/0868* (2013.01); *G06F 12/0879* (2013.01); *G06F 12/128* (2013.01); *G06F 12/0862* (2013.01); *G06F 12/0882* (2013.01); *G06F 2212/1021* (2013.01); *G06F 2212/313* (2013.01); *G06F 2212/604* (2013.01); *G06F 2212/6028* (2013.01); *G06F 2212/621* (2013.01)

(58) Field of Classification Search
CPC .... G06F 3/0611; G06F 3/0659; G06F 3/0685; G06F 12/0806; G06F 12/0868; G06F 12/128; G06F 2212/604; G06F 2212/621
See application file for complete search history.

(56) References Cited

U.S. PATENT DOCUMENTS

| 5,542,066 A | 7/1996 | Mattson et al. | |
|---|---|---|---|
| 6,463,506 B1* | 10/2002 | McAllister | G06F 12/0822 711/118 |
| 2003/0212865 A1* | 11/2003 | Hicken | G06F 12/0804 711/135 |
| 2004/0037276 A1* | 2/2004 | Henderson | H04L 49/254 370/371 |
| 2007/0079070 A1 | 4/2007 | Piry et al. | |

(Continued)

OTHER PUBLICATIONS

Li et al."Elastic-cache: GPU cache architecture for efficient fine-and coarse-grained cache-line management." 2017 IEEE International Parallel and Distributed Processing Symposium, Jul. 3, 2017 [retrieved from internet Feb. 11, 2020][<URL:https://ieeexplore.ieee.org/stamp/stamp.jsp?tp=&arnumber=7967>] (Year: 2017).*

(Continued)

*Primary Examiner* — David Yi
*Assistant Examiner* — Nicholas A. Paperno
(74) *Attorney, Agent, or Firm* — Brooks, Cameron & Huebsch, PLLC

(57) ABSTRACT

The present disclosure includes apparatuses and methods related to a memory system with cache line data. An example apparatus can store data in a number of cache lines in the cache, wherein each of the number of lines includes a number of chunks of data that are individually accessible.

25 Claims, 3 Drawing Sheets

(56) References Cited

U.S. PATENT DOCUMENTS

| | | |
|---|---|---|
| 2009/0083497 A1 | 3/2009 | Yu et al. |
| 2011/0238925 A1 | 9/2011 | Robinson |
| 2012/0159082 A1 | 6/2012 | Cox et al. |
| 2014/0075109 A1 | 3/2014 | Richardson et al. |
| 2014/0156909 A1* | 6/2014 | Farhan .................. G06F 3/0656 711/103 |
| 2015/0012690 A1* | 1/2015 | Bruce .................. G06F 12/0804 711/103 |
| 2015/0127767 A1 | 5/2015 | Gheith et al. |
| 2015/0356019 A1 | 12/2015 | Johar |
| 2015/0378919 A1 | 12/2015 | Anantaraman et al. |
| 2016/0154743 A1 | 6/2016 | Pan et al. |
| 2016/0239223 A9 | 8/2016 | Joshi et al. |
| 2016/0344837 A1 | 11/2016 | Derbeko et al. |
| 2016/0350227 A1 | 12/2016 | Hooker et al. |
| 2016/0378656 A1 | 12/2016 | Kudo |

OTHER PUBLICATIONS

International Search Report and Written Opinion from related international application No. PCT/US2018/048296, dated Dec. 14, 2018, 15 pp.

Extended European Search Report from related European Patent Application No. 18850993.9, dated May 4, 2021, 12 pages.

Quinones, L K, Institute of Electrical and Electronics Engineers: "The NS32605 cache controller", San Francisco, Feb. 29-Mar. 4, 1988, 33rd IEEE Computer Society International Conference (COMPCON), Abstract, pp. 218-222.

Notice of Preliminary Rejection from related Korean Patent Application No. 10-2020-7007517, dated Sep. 30, 2021, 12 pages.

* cited by examiner

CACHE LINE DATA

TECHNICAL FIELD

The present disclosure relates generally to memory devices, and more particularly, to method and apparatuses of memory system with cache line data.

BACKGROUND

Memory devices are typically provided as internal, semiconductor, integrated circuits in computing devices or other electronic devices. There are many different types of memory including volatile and non-volatile memory. Volatile memory can require power to maintain its data (e.g., user data, error data, etc.) and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

A memory system can include a cache memory that may be smaller and/or faster than other memory of the system (e.g., DRAM, NAND, disk storage, solid state drives (SSD), etc., which may be referred to as main memory). As an example, cache memory may comprise DRAM memory. A memory system can cache data to improve performance of the memory system. Therefore providing cache memory that delivers improved performance for the memory system is desirable. Improving the latency and hit rate of the cache memory are performance characteristics that can provide improved performance of the memory system.

DETAILED DESCRIPTION

Figure 1:
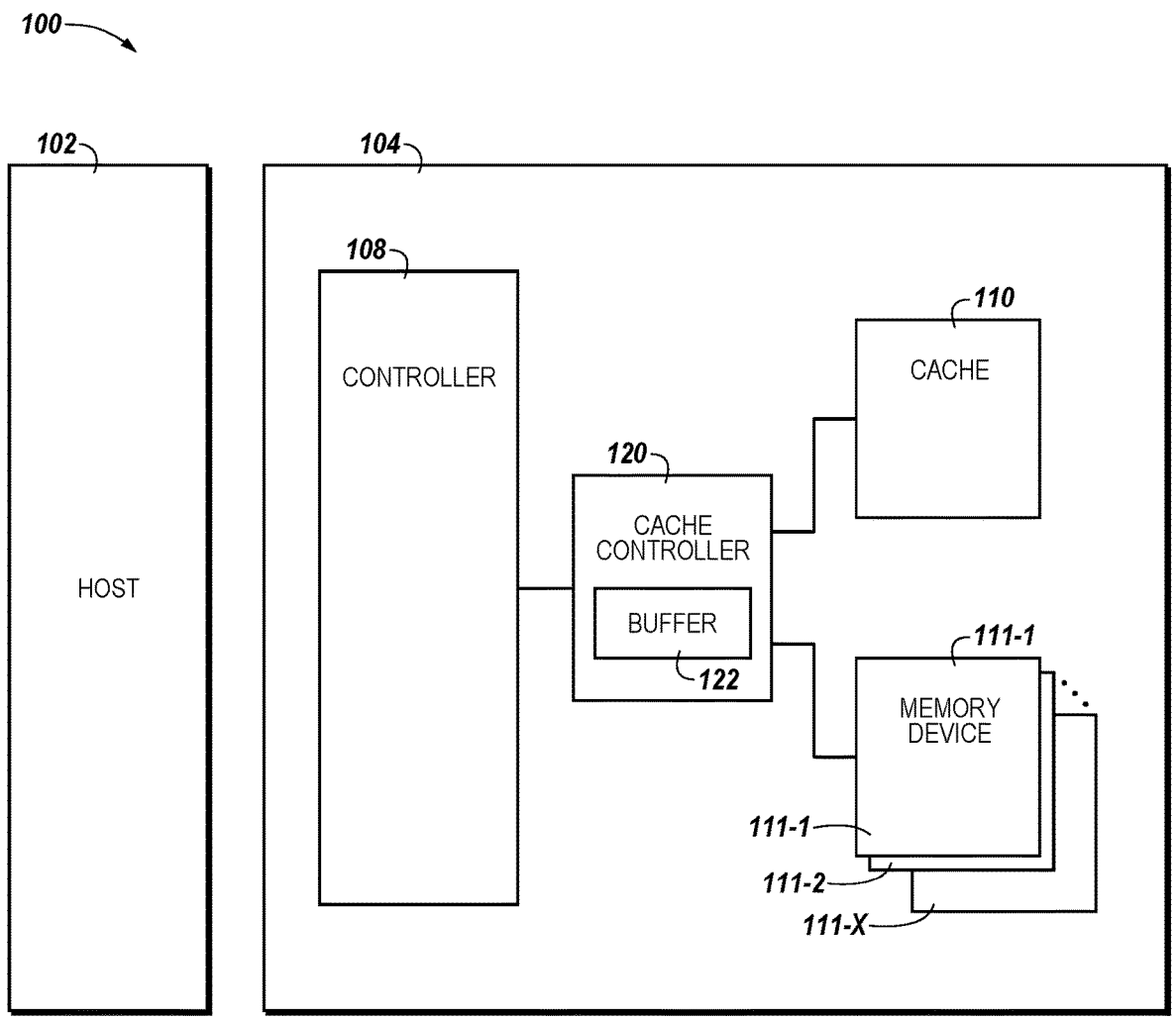
FIG. 1 is a block diagram of a computing system including an apparatus in the form of a host and an apparatus in the form of memory system in accordance with one or more embodiments of the present disclosure.

The present disclosure includes apparatuses and methods related to a memory system with cache line data. An example apparatus can store data in a number of cache lines in the cache, wherein each of the number of lines includes a number of chunks of data that are individually accessible.

In a number of embodiments, a cache line (e.g., cache entry) can include metadata, chunk metadata, tag information, and a number of chunks of data. The cache can be managed on a cache line level. For example, data transfer action determinations are made on the cache line and/or chunk level. A buffer on a cache controller can include address data and/or metadata associated with the data in the cache. The cache controller can use the address data and/or metadata in the buffer to manage the cache. The data in a cache line can be managed on the chunk level. For example, chunks of data in a cache line can be read and/or written to a cache line to service a request. The cache lines can include chunk metadata and chunks of data and the cache controller can manage the cache lines on the chunk level. For example, the cache controller can read, write, write-back, and/or fetch, among other operations, a portion of a cache line that includes a number of chunks of data that is less than a total amount of data on a cache line. Also, a cache line can be considered evicted once each of the dirty chunks of data on the cache line have been written back to the backing store in one or more operations.

In a number of embodiments, a cache line can be configured to store 4 KB of data in 32 128B chunks, for example. Embodiments are not limited to particular cache line and/or chunk sizes can include cache lines of any size and chunks of any size. A cache controller can manage the 4 KB of data in a cache line that corresponds to 4 KB of data at a particular location in a memory device (e.g., backing store). The 32 128B chunks of data in the 4 KB cache line can be accessed on an individual chunk level such that each chunk can be read and/or written when servicing requests.

The cache controller can access a number of chunks of data in a cache line of the cache in response to receiving a request for data (e.g., to read and/or write data to the cache). The cache controller can manage the request using a buffer on the cache controller and the cache controller can service the request by returning a portion of the number of chunks of data in the cache line corresponding to the request. The cache controller can be configured to issue commands to cause the cache to return the portion of the number of chunks of data corresponding to the request that were in the cache line when the request was received in response to cache controller determining the request is a hit. The cache controller can determine whether data corresponding to a request is a hit or a miss by using metadata for the cache that is stored in a buffer (e.g., SRAM, among other type of memory) on the cache controller.

In a number of embodiments, the cache controller issue commands to cause the cache to retrieve a portion of the number of chunks of data corresponding to the request from the memory device in response to cache controller determining the request is a miss. The cache controller can be configured to issue commands to cause the cache to, in response to determining the request is a miss, write dirty chunks of data in the cache line to the memory device that were in the cache line when the request was received. The cache controller is configured to issue commands to cause the cache to, in response to determining the request is a miss, select the cache line based upon the cache line having fewer dirty chunks than other cache lines in the cache.

The cache controller can be configured to issue commands to cause the cache to, in response to determining the request is a hit, write dirty chunks of data in the cache line to the memory device. The cache controller can be configured to issue commands to cause the cache to, in response to determining the request is a hit, replace chunks of data in the cache line that are not associated with the request and were invalid when the request was received.

The cache controller can prioritize particular chunks of data that will not be evicted from the cache lines. The chunks of data can be prioritized based on how often the data will be accessed and/or the type of data. The cache controller can write the chunks of data from the memory device to the cache prior to receiving a request for the chunks of data (e.g., pre-fetch). Chunks of data from a portion of a memory device can be pre-fetched and stored in the cache to at least partially fill a cache line that corresponds to the portion of the memory device.

In a number of embodiments, the cache controller can write dirty chunks of data to the memory device when not servicing commands. Also, the cache controller can select chunks of data to remain in the cache based on a command from the host. The host can identify portions of data that it would like to have in the cache and the cache controller can pin those portions of data in the cache so that they are never evicted from the cache.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "M", "N", and "X", particularly with respect to reference numerals in the drawings, indicates that a number of the particular feature so designated can be included. As used herein, "a number of" a particular thing can refer to one or more of such things (e.g., a number of memory devices can refer to one or more memory devices).

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 220 in FIG. 2. As will be appreciated, elements shown in the various embodiments herein can be added, exchanged, and/or eliminated so as to provide a number of additional embodiments of the present disclosure.

FIG. 1 is a functional block diagram of a computing system 100 including an apparatus in the form of a host 102 and an apparatus in the form of memory system 104, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1A, memory system 104 can include a controller 108, a cache controller 120, cache 110, and a number of memory devices 111-1, . . . , 111-X. The cache 120 and/or memory devices 111-1, . . . , 111-X can include volatile memory and/or non-volatile memory.

As illustrated in FIG. 1, host 102 can be coupled to the memory system 104. In a number of embodiments, memory system 104 can be coupled to host 102 via a channel. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Host 102 can includes a host controller to communicate with memory system 104. The host 102 can send commands to the memory system 104 via a channel. The host 102 can communicate with memory system 104 and/or the controller 108 on memory system 104 to read, write, and erase data, among other operations. A physical host interface can provide an interface for passing control, address, data, and other signals between the memory system 104 and host 102 having compatible receptors for the physical host interface. The signals can be communicated between host 102 and memory system 104 on a number of buses, such as a data bus and/or an address bus, for example, via channels.

Controller 108, a host controller, a controller on cache 110, and/or a controller on can include control circuitry, e.g., hardware, firmware, and/or software. In one or more embodiments, controller 108, a host controller, a controller on cache 110, and/or a controller can be an application specific integrated circuit (ASIC) coupled to a printed circuit board including a physical interface. Memory system can include cache controller 120 and cache 110. Cache controller 120 and cache 110 can be used to buffer and/or cache data that is used during execution of read commands and/or write commands.

Cache controller 120 can include buffer 122. Buffer 122 can include a number of arrays of volatile memory (e.g., SRAM). Buffer 122 can be configured to store signals, address signals (e.g., read and/or write commands), and/or data (e.g., metadata and/or write data). The buffer 122 can temporarily store signals and/or data while commands are executed. Cache 110 can include arrays of memory cells (e.g., DRAM memory cells) that are used as cache and can be configured to store data that is also stored in a memory device. The data stored in cache and in the memory device is addressed by the controller and can be located in cache and/or the memory device during execution of a command.

Memory devices 111-1, . . . , 111-X can provide main memory for the memory system or could be used as additional memory or storage throughout the memory system 104. Each memory device 111-1, . . . , 111-X can include one or more arrays of memory cells, e.g., non-volatile and/or volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the memory devices 111-1, . . . , 111-X. It will be appreciated by those skilled in the art that the number of address input connections can depend on the density and architecture of the memory devices 111-1, . . . , 111-X.

Figure 2:
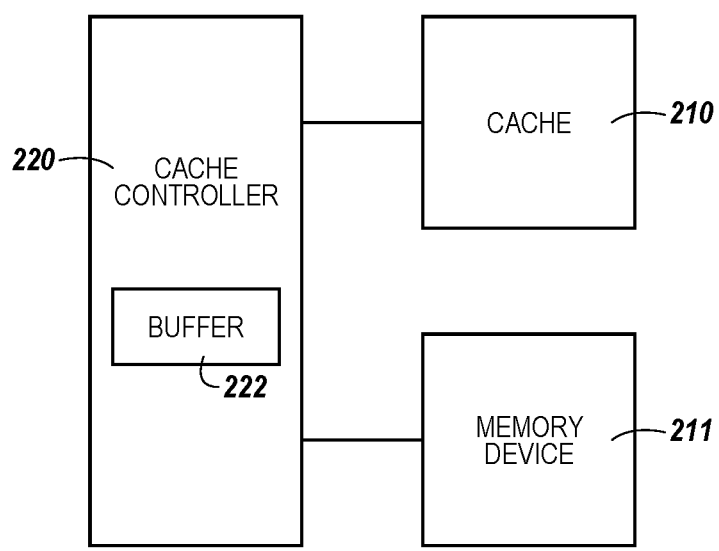
FIG. 2 is a block diagram of an apparatus in the form of a memory system in accordance with a number of embodiments of the present disclosure.

FIG. 2 is a block diagram of an apparatus in the form of a memory system in accordance with a number of embodiments of the present disclosure. In FIG. 2, the memory system can be configured to cache data and service requests from a host and/or memory system controller. The memory system can include cache controller 220 with buffer 222. Buffer 222 can include SRAM memory, for example. Buffer 222 can include information about the data in cache 210, including metadata and/or address information for the data in the cache. The memory system can include a memory device 211 coupled to the cache controller 220. Memory device 211 can include non-volatile memory arrays and/or volatile memory arrays and can serve as the backing store for the memory system.

Cache controller 220, cache 210, and/or memory device 211 can each include a controller and/or control circuitry (e.g., hardware, firmware, and/or software) which can be used to execute commands on the cache controller 220, cache 210, and/or memory device 211. The control circuitry can receive commands from a host controller, a memory system controller, and/or cache controller 220. The control circuitry can be configured to execute commands to read and/or write data in the memory device 211.

Figure 3:
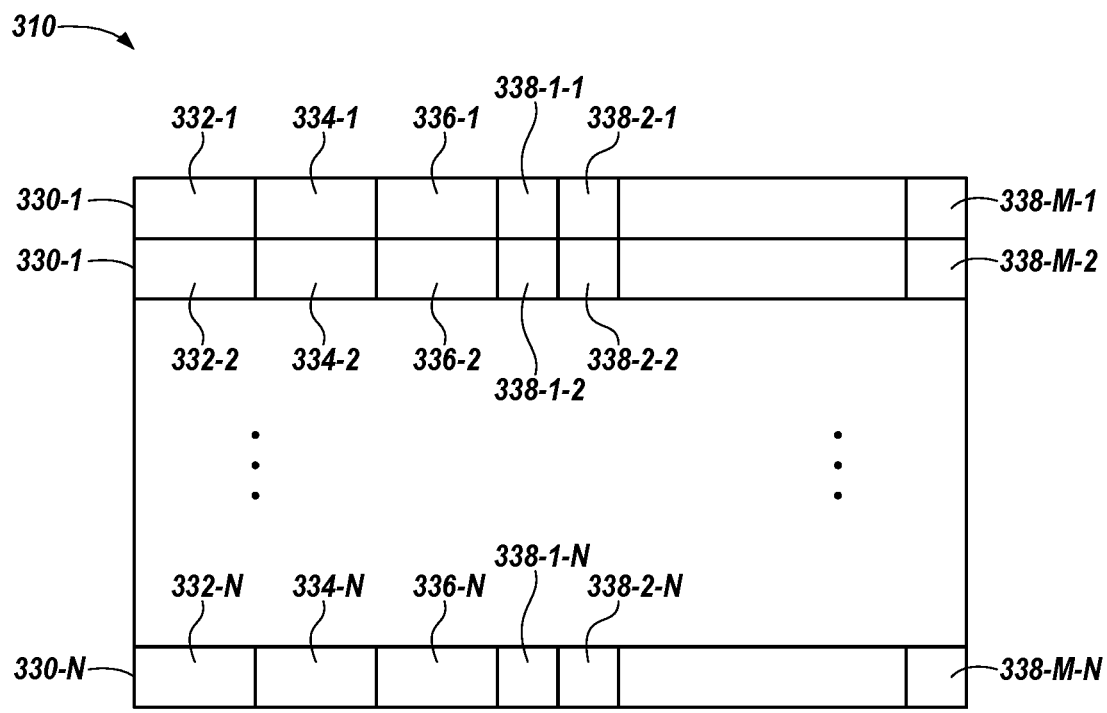
FIG. 3 is a block diagram of an apparatus in the form of a cache including a number of cache lines in accordance with a number of embodiments of the present disclosure.

FIG. 3 is a block diagram of an apparatus in the form of a cache including a number of cache lines in accordance with a number of embodiments of the present disclosure. In FIG. 3, cache 310 can include a number of cache entries, such as cache lines 330-1, . . . , 330-N. The cache lines 330-1, . . . , 330-N can include metadata 332-1, . . . 332-N, chunk metadata 332-1, . . . 332-N, tag data 336-1, . . . , 336-N, and a number of chunks of data 338-1-1, . . . , 338-M-N. Each cache line 330-1, . . . , 330-N can include metadata 332-1, . . . 332-N for a corresponding cache line. The metadata 332-1, . . . 332-N can also be stored in a buffer (e.g., buffer 122 in FIG. 1) and used by the cache controller to manage the cache. For example, the metadata 332-1, . . . 332-N can be used and updated by the cache controller to make hit/miss determinations for requests from the host.

Each cache line can include chunk metadata 332-1, . . . 332-N for a corresponding cache line. Chunk metadata 332-1, . . . 332-N can be used to execute commands. For example, a request for a portion of data on a cache line can be serviced by using the chunk metadata 332-1, . . . 332-N to determine if the portion of data in the request is valid and/or dirty, to determine the location of the portion of data in the cache line, and/or to retrieve the portion of data from the cache line. The cache controller can access the chuck metadata 332-1, . . . 332-N for servicing a request to read and/or write data to the cache.

Each cache line can include chunks of data 338-1-1, . . . , 338-M-N for a corresponding cache line. Chunks of data chunks of data 338-1-1, . . . , 338-M-N can be accessed on a chunk by chunk basis by the cache controller when servicing a request. Each chunk of data 338-1-1, . . . , 338-M-N can include 128B of data and a cache line can include 128 chunks to store 4 KB of data, for example.

Figure 4:
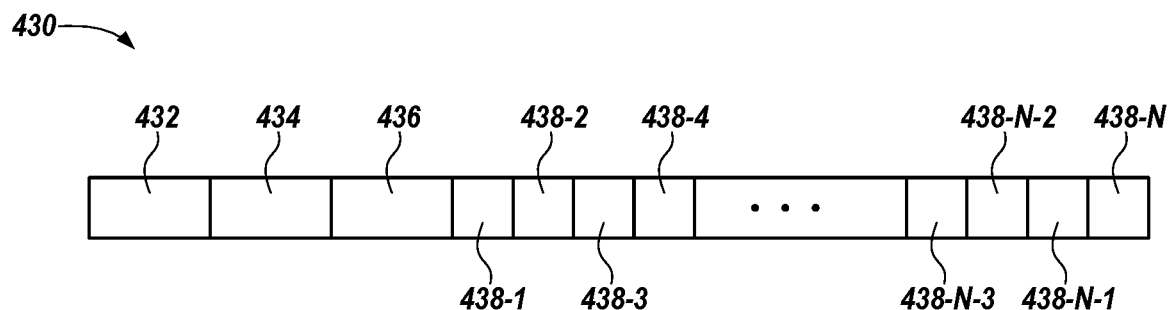
FIG. 4 is a diagram of a cache line in accordance with a number of embodiments of the present disclosure.

FIG. 4 is a diagram of a cache line in accordance with a number of embodiments of the present disclosure. The cache line 430 can include metadata 432, chunk metadata 434, tag data 436, and a number of chunks of data 438-1 . . . , 438-N.

The cache controller can access the chunks of data 438-1 . . . , 438-N in cache line 430 in response to receiving a request for data (e.g., to read and/or write data to the cache). A portion of number of chunks of data 438-1 . . . , 438-N corresponding to a request that were in the cache line when a request was received can be read and returned to the cache controller and/or host. For example, a request for data can be serviced by returning chunks of 438-2, 438-3, 438-4, and 438-5. A cache controller can determine whether chunks of data 438-1 . . . , 438-N correspond to a request by using metadata for the cache that is stored in the buffer on the cache controller.

In a number of embodiments, the cache can write a portion of chunks of data 438-1 . . . , 438-N that are dirty. Also, when selecting a cache line to evict from the cache, a cache line with the fewest dirty chunks can be selected so that fewer chunks of data are written to the memory device when evicting a cache line from the cache.

The cache controller issue commands to cause the cache to, in response to determining the request is a hit, write dirty chunks of data in the cache line to the memory device. The cache controller can issue commands to cause the cache to, in response to determining the request is a hit, replace chunks of data in the cache line that are not associated with the request and were invalid when the request was received.

The cache controller can prioritize particular chunks of data that will not be evicted from the cache lines. The chunks of data can be prioritized based on how often the data will be accessed and/or the type of data. The cache controller can write the chunks of data from the memory device to the cache prior to receiving a request for the chunks of data (e.g., pre-fetch). Chunks of data from a portion of a memory device can be pre-fetched and stored in the cache to at least partially fill a cache line that corresponds to the portion of the memory device.

In a number of embodiments, the cache controller can write dirty chunks of data to the memory device when not servicing commands. Also, the cache controller can select chunks of data to remain in the cache based on a command from the host. The host can identify portions of data that it would like to have in the cache and the cache controller can pin those portions of data in the cache so that they are never evicted from the cache.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
  a cache controller; and
  a cache and a memory device coupled to the cache controller, wherein the cache controller is configured to issue commands to cause the cache to:
    store data in a number of cache lines in the cache, wherein:
      each of the number of cache lines includes a number of chunks of data that are individually accessible;

in response to a request from the cache controller resulting in a hit, wherein the hit includes a portion of the number of chunks of data on a first cache line of the number of cache lines:
read the portion of the number of chunks of data stored in the first cache line of the number of cache lines and return the portion of the number of chunks of data to the cache controller, wherein:
the portion of the number of chunks of data is less than a total number of chunks of data on the first cache line of the number of cache lines;
prioritize particular chunks of data that will not be evicted from the cache lines, wherein a host identifies chunks of data in the cache that are never evicted from the cache;
select dirty chunks of the first cache line for writing back to the memory device, wherein the selected dirty chunks include chunks of the portion of the number of chunks that were a hit and returned to the cache controller when executing the request and wherein the selected dirty chunks remain valid in the first cache line that included chunks that were a hit.

2. The apparatus of claim 1, wherein each of the number of lines includes metadata, chunk metadata, tag information, and the number of chunks of data.

3. The apparatus of claim 1, wherein the cache controller is configured to cause the cache to access a portion of the number of chunks of data in a particular cache entry while executing a command.

4. The apparatus of claim 1, wherein each of the number of lines includes metadata that is managed using a buffer on the cache controller.

5. The apparatus of claim 1, wherein each of the number of lines includes chunk metadata that is managed and updated by the cache controller as commands are executed.

6. An apparatus, comprising:
a cache controller; and
a cache and a memory device coupled to the cache controller, wherein the cache controller is configured to issue commands to cause the cache to:
access a portion of a number of chunks of data in a first cache line of a number of cache lines of the cache in response to receiving a request, wherein:
the cache controller manages the request using a buffer on the cache controller; and
the cache controller services the request by:
reading the portion of the number of chunks of data from the first cache line of the number of cache lines in response to the request resulting in a hit, wherein:
the portion of the number chunks of data corresponding to the hit are the portion of the number of chunks of data from the cache lines; and
the portion of the number of chunks of data is less than a total number of chunks of data; and
returning the portion of the number of chunks of data in the first cache line corresponding to the hit;
in response to determining the request is a hit, pre-fetch chunks of data and write the number of chunks of data to the cache line, wherein the pre-fetched chunks of data were not included in the request and are located in a portion of the memory device where the portion of the number of chunks of data returned when servicing the request are located such that the number of chunks of data returned when the servicing the request and the pre-fetched chunks of data are on the same cache line;
prioritize particular chunks of data that will remain in the cache lines, wherein:
the particular chunks of data are prioritized based on the frequency at which the chunks of data will be accessed; and
a host identifies chunks of data that will never be evicted from the cache; and
select dirty chunks of the first cache line for writing back to the memory device, wherein the selected dirty chunks include chunks of the portion of the number of chunks that were a hit and returned to the cache controller when executing the request and wherein the selected dirty chunks remain valid in the first cache line that included chunks that were a hit.

7. The apparatus of claim 6, wherein the cache controller is configured to issue commands to cause the cache to return the portion of the number of chunks of data corresponding to the request that were in the cache line when the request was received in response to cache controller determining the request is a hit.

8. The apparatus of claim 6, wherein the cache controller is configured to issue commands to cause the cache to retrieve the portion of the number of chunks of data corresponding to the request from the memory device in response to cache controller determining the request is a miss.

9. The apparatus of claim 6, wherein the cache controller is configured to issue commands to cause the cache to, in response to determining the request is a miss, write dirty chunks of data in the cache line to the memory device that were in the cache line when the request was received.

10. The apparatus of claim 6, wherein the cache controller is configured to issue commands to cause the cache to, in response to determining the request is a miss, select the cache line based upon the cache line having fewer dirty chunks than other cache lines in the cache.

11. The apparatus of claim 6, wherein the cache controller is configured to issue commands to cause the cache to, in response to determining the request is a hit, write dirty chunks of data in the cache line to the memory device.

12. The apparatus of claim 6, wherein the cache controller is configured to issue commands to cause the cache to, in response to determining the request is a hit, replace chunks of data in the cache line that are not associated with the request and were invalid when the request was received.

13. An apparatus, comprising:
a cache controller; and
a cache and a memory device coupled to the cache controller, wherein the cache controller is configured to:
receive requests from a host;
manage the requests using a buffer on the cache controller;
service commands by:
returning a portion of a number of chunks of data from a first cache line of a number of cache lines of the cache to the host, in response to the request resulting in a hit, wherein:
the portion of the number of chunks of data correspond to the hit;
reading the portion of the number of chunks of data from the cache lines, wherein:
the portion of the number of chunks of data is less than a total number of chunks of data;

the host identifies chunks of the data in the cache that are never evicted from the cache; and
the dirty chunks remain valid in the cache line that included chunks that were a hit; and
prioritize particular chunks of data that will not be evicted from the cache lines, wherein:
the particular chunks of data are prioritized based on a type of data.

14. The apparatus of claim 13, wherein the cache controller is configured to write the chunks of data from the memory device to the cache prior to receiving a request for the chunks of data.

15. The apparatus of claim 13, wherein the cache controller is configured to write dirty chunks of data to the memory device when not servicing commands.

16. The apparatus of claim 13, wherein the cache controller is configured to select chunks of data to remain in the cache based on a command from the host.

17. A method, comprising:
receiving a request for data at a cache controller;
determining whether portions of a number of chunks of data associated with the request are in the cache using a buffer on the cache controller;
servicing the request, in response to determining the request resulted in a hit, by:
reading the portion of the number of chunks of data that correspond to the hit from a first cache line of a number of cache lines, wherein:
the portion of the number of chunks of data is less than a total number of chunks of data;
returning the portion of the number of chunks of data corresponding to the hit from the first cache line indicated by the buffer;
in response to determining the request is a hit, pre-fetching chunks of data and writing the chunks to the cache line, wherein the pre-fetched chunks of data were not included in the request and are located in a portion of a memory device where the portion of the number of chunks of data returned when servicing the request are located;
prioritizing particular chunks of data that will not be evicted from the cache lines, wherein the host identifies chunks of the data in the cache that are never evicted from the cache and wherein the chunks of data are prioritized based on:
the frequency at which the data will be accessed; and
the type of data; and
selecting dirty chunks of the first cache line for writing back to the memory device, wherein the selected dirty chunks include chunks of the portion of the number of chunks that were a hit and returned to the cache controller when executing the request and wherein the selected dirty chunks remain valid in the first cache line that included chunks that were a hit.

18. The method of claim 17, further including servicing the request, in response to determining the request is a miss, by writing a number of chunks of data associated with the request from a memory device to a cache line indicated by the buffer.

19. The method of claim 18, further including servicing the request, in response to determining the request is a miss, by returning a number of chunks of data from the cache line indicated by the buffer.

20. The method of claim 17, wherein servicing the request includes updating chunk metadata associated with the number of chunks of data.

21. A method, comprising:
storing data in a number of cache lines in the cache, wherein:
each of the number of cache lines includes a number of chunks of data that are individually accessible by a cache controller;
reading a portion of the number of chunks of data from a first cache line of the number of cache lines in response to a request resulting in a hit, wherein:
the portion of the number of chunks of data correspond to the hit; and
the portion of the number of chunks of data is less than a total number of chunks of data;
pre-fetching a number of chunks of data to replace chunks of data on a particular cache line that were not associated with a request that resulted in a hit and were invalid when the request was received, wherein the request resulted in a hit on the particular cache line;
prioritizing, in response to determining the request is a hit, particular chunks of data that will remain in the cache lines, wherein a host identifies portions of data in the cache that are never evicted from the cache; and
selecting dirty chunks of the first cache line for writing back to the memory device, wherein the selected dirty chunks include chunks of the portion of the number of chunks that were a hit and returned to the cache controller when executing the request and wherein the selected dirty chunks remain valid in the first cache line that included chunks that were a hit.

22. The apparatus of claim 1, further including servicing a request for data using data stored in a buffer on the cache controller.

23. The apparatus of claim 1, further including accessing a portion of the number of chunks of data in a particular cache entry while executing a command.

24. The apparatus of claim 1, further including managing the data in the cache using a buffer on the cache controller.

25. The apparatus of claim 1, wherein further including managing chunk metadata by the cache controller as commands are executed.

* * * * *